United States Patent
Ariga

(10) Patent No.: US 10,884,892 B2
(45) Date of Patent: Jan. 5, 2021

(54) NON-TRANSITORY COMPUTER-READABLE STORAGE MEDIUM, DISPLAY CONTROL METHOD AND DISPLAY CONTROL DEVICE FOR OBSERVING ANOMOLIES WITHIN DATA

(71) Applicant: FUJITSU LIMITED, Kawasaki (JP)

(72) Inventor: Koki Ariga, Nagakute (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 16/014,132

(22) Filed: Jun. 21, 2018

(65) Prior Publication Data

US 2019/0004923 A1    Jan. 3, 2019

(30) Foreign Application Priority Data

Jun. 28, 2017    (JP) .................................. 2017-126296

(51) Int. Cl.
*G06F 11/34*    (2006.01)
*G06F 11/32*    (2006.01)
*G06F 11/30*    (2006.01)

(52) U.S. Cl.
CPC ...... *G06F 11/3495* (2013.01); *G06F 11/3051* (2013.01); *G06F 11/32* (2013.01);
(Continued)

(58) Field of Classification Search
CPC ........ G06F 9/4446; G06F 11/30; G06F 11/32; G06F 11/34; G06F 11/323; G06F 11/3051; G06F 11/3409; G06F 11/3419; G06F 11/3495; G06F 13/00; G06F 2201/875; G06N 5/02; G06N 5/003; G06N 5/004;
(Continued)

(56) References Cited

U.S. PATENT DOCUMENTS 6,449,739 B1    9/2002    Landan
2014/0039834 A1 *    2/2014    Shibuya .................. G06F 11/22
702/183

(Continued)

FOREIGN PATENT DOCUMENTS

JP    2003-508849    3/2003
JP    2015-092420    5/2015
(Continued)

*Primary Examiner* — Robert B Harrell
(74) *Attorney, Agent, or Firm* — Fujitsu Patent Center

(57) ABSTRACT

A non-transitory computer-readable storage medium storing a program that causes a computer to execute a process including collecting information of a plurality of kinds of observation data for each of a plurality of devices, performing anomaly detection processing on the collected plurality of kinds of observation data, displaying a first display indicating a relation between a time period in which an anomaly is detected within a specific period and a device in which the anomaly is detected, displaying a second display upon receiving a first designation of the device and the time period in the first display, the second display indicating a relation between the time period and the observation data, and displaying a third display upon receiving a second designation of observation data in the second display, the third display indicating time series changes in the observation data specified in the second display and the designated time period.

8 Claims, 15 Drawing Sheets

(52) U.S. Cl.
CPC ........ *G06F 11/323* (2013.01); *G06F 11/3409* (2013.01); *G06F 11/3419* (2013.01); *G06F 2201/875* (2013.01)

(58) Field of Classification Search
CPC .......... G06N 5/045; G06N 7/00; G06N 99/00; G06N 99/005; G09B 7/04; H04L 12/26; H04L 12/2602; H04L 29/06; H04L 29/08072; H04L 41/22; H04L 41/064; H04L 41/142; H04L 41/5009; H04L 43/00
USPC ............................................ 706/11; 709/224
See application file for complete search history.

(56) References Cited

U.S. PATENT DOCUMENTS

| | | |
|---|---|---|
| 2014/0317286 A1 | 10/2014 | Masuda et al. |
| 2015/0073894 A1* | 3/2015 | Leaute ............... G06Q 30/0248 705/14.47 |
| 2017/0061307 A1* | 3/2017 | Bates ..................... H04L 41/142 |
| 2017/0097863 A1* | 4/2017 | Ishii ..................... G06F 11/0754 |
| 2018/0324199 A1* | 11/2018 | Crotinger ............ H04L 63/1425 |

FOREIGN PATENT DOCUMENTS

| | | |
|---|---|---|
| WO | 01/16753 | 3/2001 |
| WO | 2017/037801 | 3/2017 |

* cited by examiner

NON-TRANSITORY COMPUTER-READABLE STORAGE MEDIUM, DISPLAY CONTROL METHOD AND DISPLAY CONTROL DEVICE FOR OBSERVING ANOMOLIES WITHIN DATA

CROSS-REFERENCE TO RELATED APPLICATION

This application is based upon and claims the benefit of priority of the prior Japanese Patent Application No. 2017-126296, filed on Jun. 28, 2017, the entire contents of which are incorporated herein by reference.

FIELD

The embodiment discussed herein is related to a non-transitory computer-readable storage medium, a display control method, and a display control device.

BACKGROUND

There is a monitoring system which collects performance information from components (a computer, an operating system, an application, and the like) constituting a system as a monitoring target, analyzes the performance information, and determines whether or not the performance of the system is adequate (see Japanese Laid-open Patent Publication No. 2015-092420, for example). In addition, although system monitoring software provides a function of checking a rule (data threshold value check or the like) registered in advance, there is an enormous amount of data to be viewed by a system operation monitor for monitoring (see International Publication Pamphlet No. WO 2017/037801, for example).

SUMMARY

According to an aspect of the embodiment, a non-transitory computer-readable storage medium storing a program that causes a computer to execute a process, the process including collecting information of a plurality of kinds of observation data for each of a plurality of devices, performing anomaly detection processing on the collected plurality of kinds of observation data, displaying, on a screen of display device, a first display indicating a correspondence relation between a time period in which an anomaly is detected within a specific period and a device in which the anomaly is detected based on a result of the anomaly detection processing, displaying, on the screen, a second display upon receiving a first designation of the device and the time period in the first display, the second display indicating a correspondence relation between the time period in which the anomaly is detected based on the plurality of kinds of observation data within the specific period in the designated device and the observation data, and displaying, on the screen, a third display upon receiving a second designation of observation data in the second display, the third display indicating time series changes in the observation data specified in the second display for the device and the designated time period designated in the first designation such that a timing at which the anomaly is detected is recognized.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In one aspect, it is an object to reduce a work load of monitoring work.

A mode for carrying out the present matter will hereinafter be described with reference to the drawings.

Figure 1:
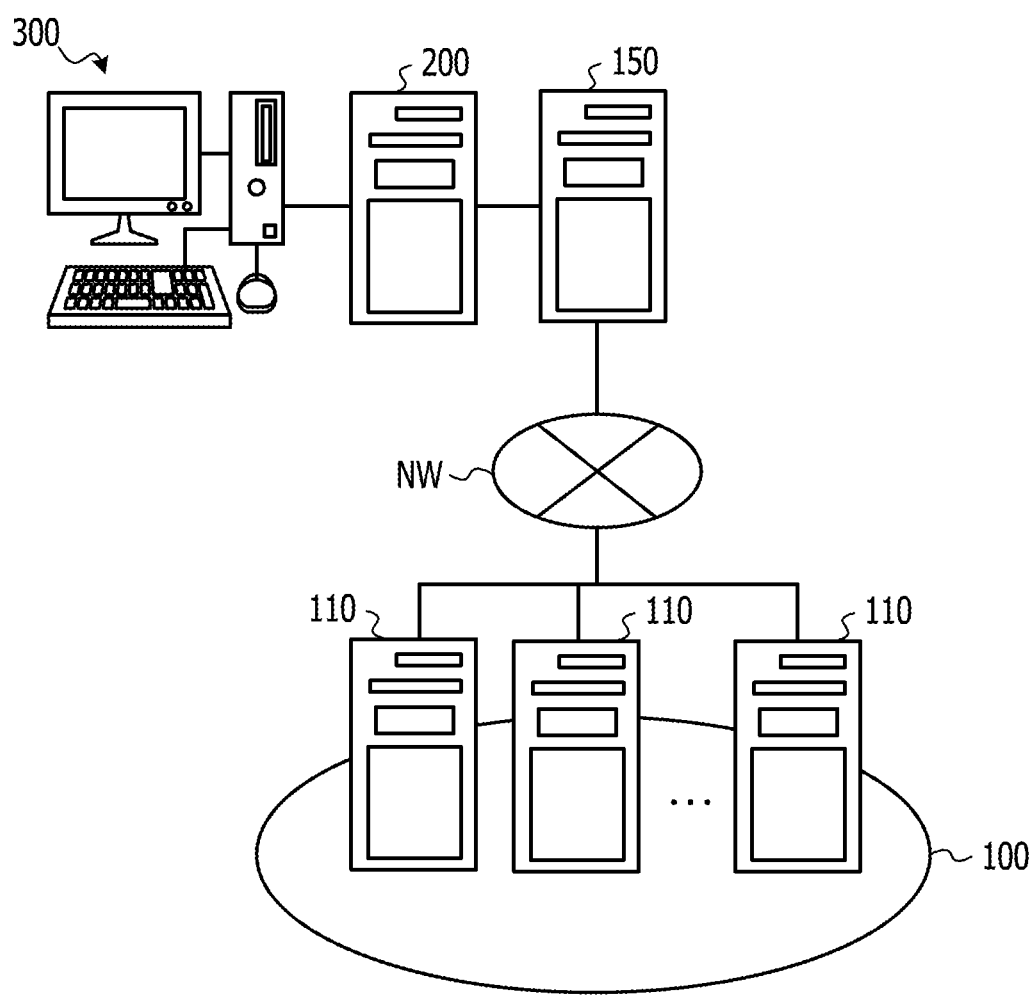
FIG. 1 represents an example of a display control system.

FIG. 1 represents an example of a display control system. A display control system S includes, as constituent elements, a monitoring target system 100, a monitoring server 150, and an analysis server 200 as a display control device. A monitoring terminal 300 may be included in the constituent elements of the display control system S, or may not be included in the constituent elements of the display control system S. The monitoring terminal 300 is, for example, implemented by a personal computer (PC) including an input device, a display device, and a control device, or a smart device such as a tablet terminal or the like.

The monitoring target system 100 includes a plurality of monitoring target resources 110. The monitoring target resources 110 are computer resources. Various kinds of server devices such as a Web server, an application server, a database server, a virtualized server, and the like as well as a storage device, and a network device, correspond to the monitoring target resources 110. Hence, the monitoring target system 100 may be referred to as a computer system or an information and communication technology (ICT) system. An end user (not illustrated) of the display control system S may access the monitoring target system 100, and use various functions provided by the monitoring target resources 110.

The monitoring server 150 accesses the monitoring target resources 110 through a communication network NW, and monitors the performance and loads of the monitoring target resources 110. For example, the monitoring server 150 obtains, from each of the plurality of monitoring target resources 110, a plurality of kinds of performance values indicating operation information of the monitoring target resources 110, such as a central processing unit (CPU) usage rate, memory space information, disk throughput, and the like, and compares and manages the obtained performance values from various angles. Incidentally, the communication network NW includes a local area network (LAN), the Internet, and the like.

The analysis server 200 is coupled to the monitoring server 150. For example, the analysis server 200 may be directly coupled to the monitoring server 150, as illustrated in FIG. 1, or may be indirectly coupled to the monitoring server 150 via the communication network NW. The analysis server 200 collects a log of the plurality of kinds of performance values obtained by the monitoring server 150 as observation data, and performs anomaly detection processing on the plurality of kinds of collected observation data. The anomaly detection processing analyzes the plurality of kinds of observation data, and detects or senses a difference from states at a normal time of the monitoring target resources 110. As will be described later in detail, when the analysis server 200 receives various kinds of instructions from the monitoring terminal 300, the analysis server 200 makes various kinds of display indicating anomaly analysis results on the monitoring terminal 300.

A hardware configuration of the analysis server 200 will next be described with reference to FIG. 2. Incidentally, the plurality of monitoring target resources 110, the monitoring server 150, and the monitoring terminal 300 described above are basically of a hardware configuration similar to that of the analysis server 200, and therefore description thereof will be omitted.

Figure 2:
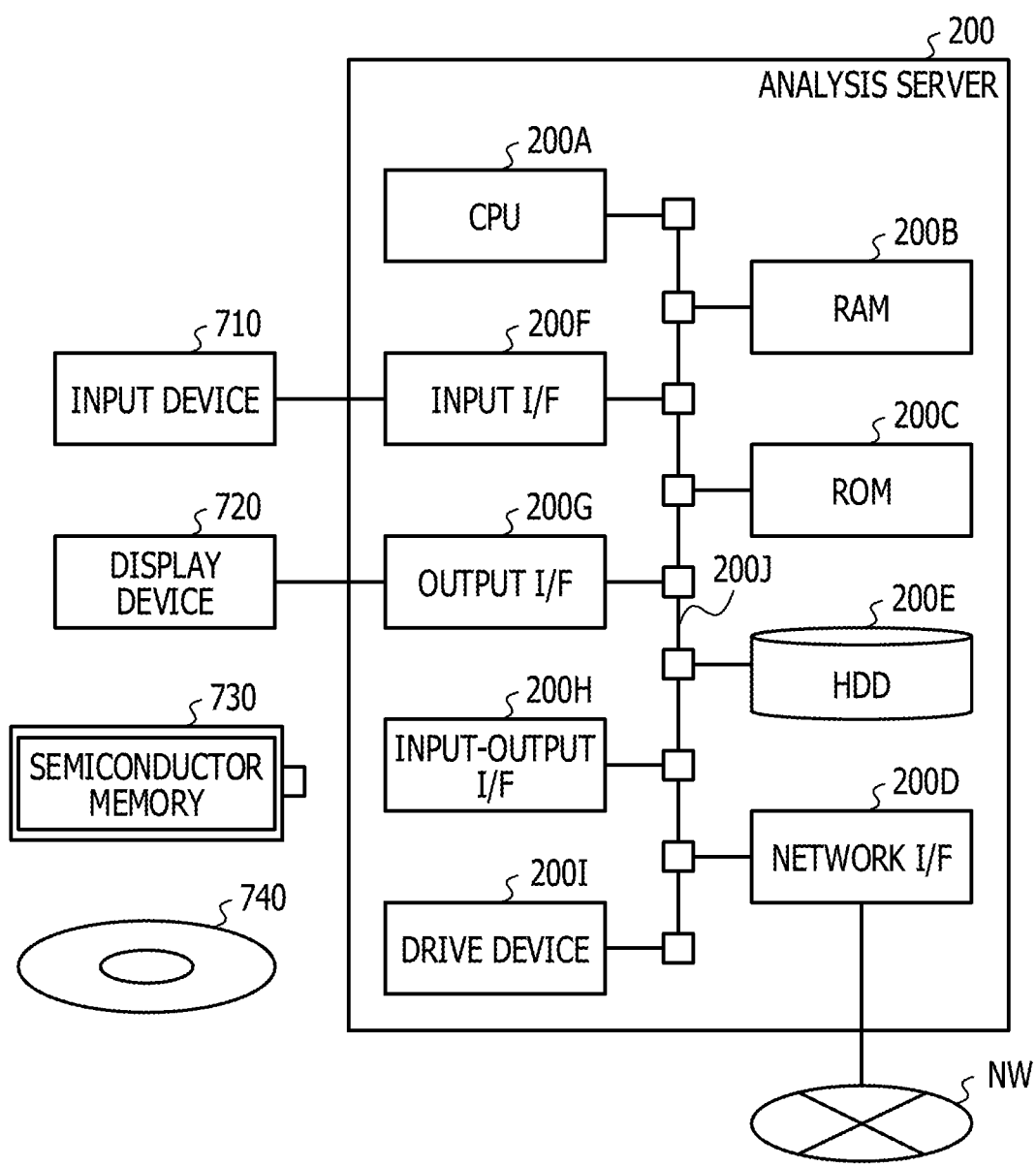
FIG. 2 represents an example of a hardware configuration of an analysis server.

FIG. 2 represents an example of a hardware configuration of an analysis server. The analysis server illustrated in FIG. 2 may be the analysis server 200 illustrated in FIG. 1. As illustrated in FIG. 2, the analysis server 200 includes at least a CPU 200A as a processor, a random access memory (RAM) 200B, a read only memory (ROM) 200C, and a network I/F (interface) 200D. The analysis server 200 may include at least one of a hard disk drive (HDD) 200E, an input I/F 200F, an output I/F 200G, an input-output I/F 200H, and a drive device 200I as needed. The constituent elements from the CPU 200A to the drive device 200I are coupled to each other by an internal bus 200J. A computer is implemented by cooperation of at least the CPU 200A and the RAM 200B. Incidentally, a micro processing unit (MPU) may be used as a processor in place of the CPU 200A.

An input device 710 is coupled to the input I/F 200F. The input device 710 includes a keyboard, a mouse, and the like. A display device 720 is coupled to the output I/F 200G. The display device 720 includes, for example, a liquid crystal display. A semiconductor memory 730 is coupled to the input-output I/F 200H. The semiconductor memory 730 includes a universal serial bus (USB) memory, a flash memory, and the like. The input-output I/F 200H reads a program and data stored in the semiconductor memory 730. The input I/F 200F and the input-output I/F 200H, for example, include a USB port. The output I/F 200G, for example, includes a display port.

A portable recording medium 740 is inserted into the drive device 200I. The portable recording medium 740, for example, includes removable disks such as a compact disc (CD)-ROM, a digital versatile disc (DVD), and the like. The drive device 200I reads a program and data recorded on the portable recording medium 740. The network I/F 200D, for example, includes a LAN port. The network I/F 200D is coupled to the communication network NW described above.

A program stored in the ROM 200C or on the HDD 200E is stored into the above-described RAM 200B by the CPU 200A. The program recorded on the portable recording medium 740 is stored into the RAM 200B by the CPU 200A. The CPU 200A executes the stored program, and thereby implements various kinds of functions to be described later and performs various kinds of processing to be described later. Incidentally, it suffices for the program to be based on flowcharts to be described later.

Figure 4:
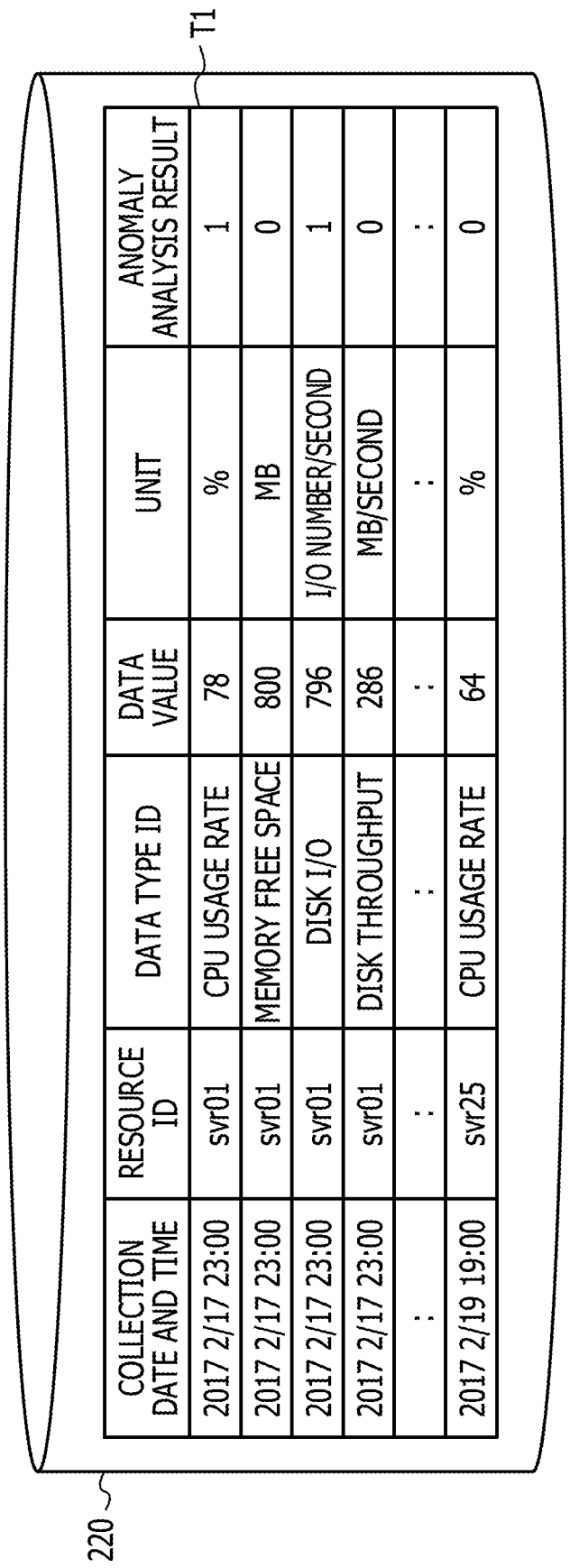
FIG. 4 represents an example of an observation data storage unit.
Figure 5:
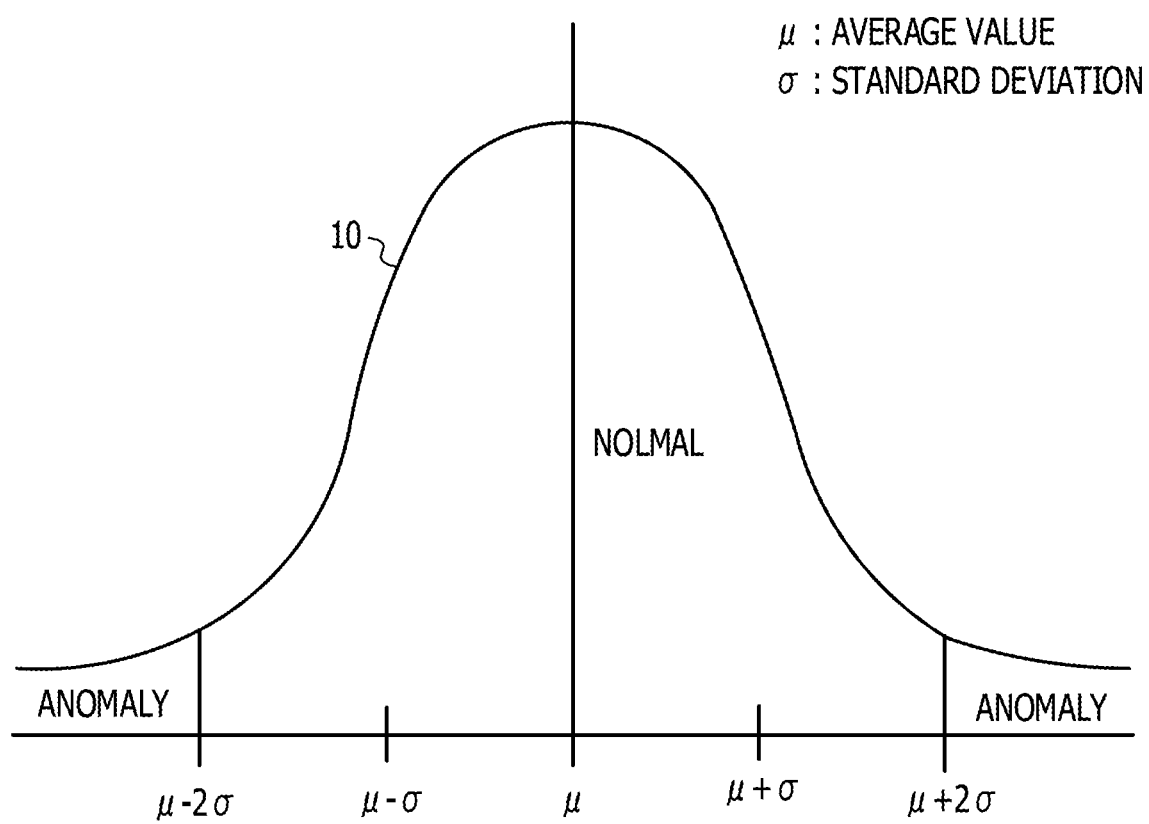
FIG. 5 represents an example of a normal distribution of observation data.

A functional configuration of the analysis server 200 will next be described with reference to FIGS. 3 to 5.

Figure 3:
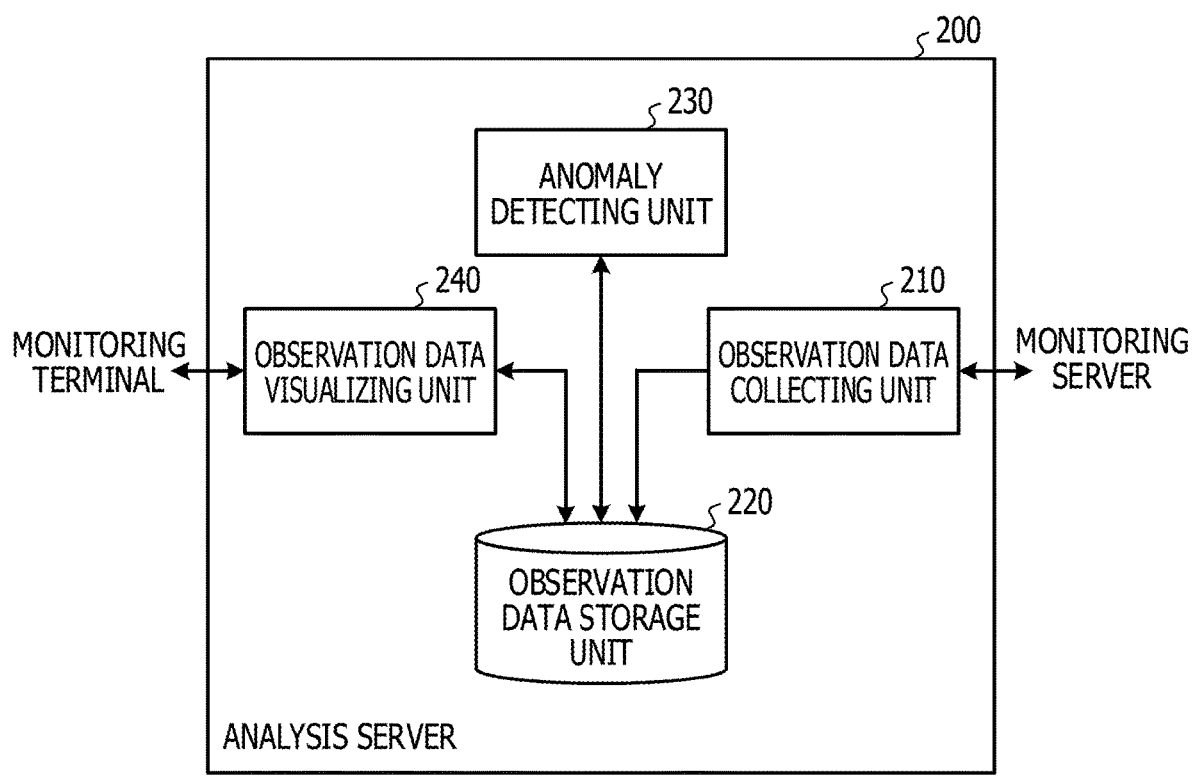
FIG. 3 is an example of a block diagram of an analysis server.

FIG. 3 is an example of a block diagram of an analysis server. The analysis server illustrated in FIG. 3 may be the analysis server 200 illustrated in FIG. 1. FIG. 4 represents an example of an observation data storage unit. FIG. 5 represents an example of a normal distribution of observation data. As illustrated in FIG. 3, the analysis server 200 includes an observation data collecting unit 210, an anomaly detecting unit 230, and an observation data visualizing unit 240 as processing units. The analysis server 200 also includes an observation data storage unit 220.

Incidentally, the observation data collecting unit 210 is implemented by the CPU 200A by executing a publicly known log collecting and transferring tool (software such as Fluentd or Logstash). The observation data storage unit 220 is implemented by the CPU 200A by executing a distributed retrieval real time analysis engine (software such as Elasticserch) of open source software (OSS) and cooperating with the HDD 200E. The anomaly detecting unit 230 is implemented by the CPU 200A by executing a part of first processing to be described later. The observation data visualizing unit 240 is implemented by the CPU 200A by executing a publicly known data visualizing tool (software such as kibana).

The observation data collecting unit 210 collects a plurality of kinds of observation data from the monitoring server 150. For example, the observation data collecting unit 210 accesses the monitoring server 150 periodically (for example, in units of 10 minutes), and collects, as observation data, each of a plurality of kinds of performance values obtained from each of the plurality of monitoring target resources 110 by the monitoring server 150. When the observation data collecting unit 210 collects the observation data, the observation data collecting unit 210 stores the collected observation data in the observation data storage unit 220. Thus, as illustrated in FIG. 4, the observation data storage unit 220 stores a plurality of kinds of observation data for each of the monitoring target resources 110.

For example, the observation data storage unit 220 stores the observation data managed by an analysis target table T1. The analysis target table T1 manages a plurality of constituent elements such as a collection date and time, a resource identifier (ID), a data type ID, a data value, a unit, and an anomaly analysis result in association with each other. The collection date and time is a date and time of collection of observation data. The resource ID is identification information identifying a monitoring target resource 110. The data type ID is identification information identifying a performance type of the observation data. The data value and the unit are an actual measured value indicating performance of the observation data and a symbol or a character indicating the unit of the actual measured value. The anomaly analysis result is a distinguishing flag distinguishing whether or not an anomaly to be described later is detected. For example, the distinguishing flag "1" indicates that an anomaly is detected. The distinguishing flag "0" indicates that no anomaly is detected. The plurality of kinds of observation data related to performance are thus managed for each of the monitoring target resources 110 by the analysis target table T1.

The anomaly detecting unit 230 obtains the observation data from the observation data storage unit 220, and performs anomaly detection processing on the observation data. For example, as illustrated in FIG. 5, the anomaly detecting unit 230 generates a normal distribution 10 of the observation data (for example, the data values of the observation data) for each resource ID and each data type ID based on the observation data obtained from the observation data storage unit 220, and detects, as an anomaly, observation data deviating from an average value μ of the normal distribution 10 by 2σ or more. The anomaly detecting unit 230 registers a distinguishing flag "1" as an analysis result in the anomaly analysis result of the analysis target table T1 for the observation data from which an anomaly is detected. On the other hand, for observation data from which no anomaly is detected, the anomaly detecting unit 230 registers a distinguishing flag "0" as an analysis result in the anomaly analysis result of the analysis target table T1.

When the observation data visualizing unit 240 receives a screen display request requesting display of an anomaly analysis screen from the monitoring terminal 300, the observation data visualizing unit 240 obtains the observation data for which the distinguishing flag is registered from the observation data storage unit 220, and visualizes the obtained observation data. For example, the observation data visualizing unit 240 generates a graph indicating data values of the obtained observation data in time series, and adds a mark indicating that an anomaly is detected to a position in the graph, the position corresponding to the observation data for which the distinguishing flag "1" is registered as the anomaly analysis result. The shape and color of the mark may be determined as appropriate in design or the like. As will be described later in detail, in the present embodiment, the shape of the mark is a circle, and the color of the mark is red. The observation data visualizing unit 240 displays the anomaly analysis screen including the graph to which the mark is added on the monitoring terminal 300.

Operation of the analysis server 200 will next be described.

Figure 6:
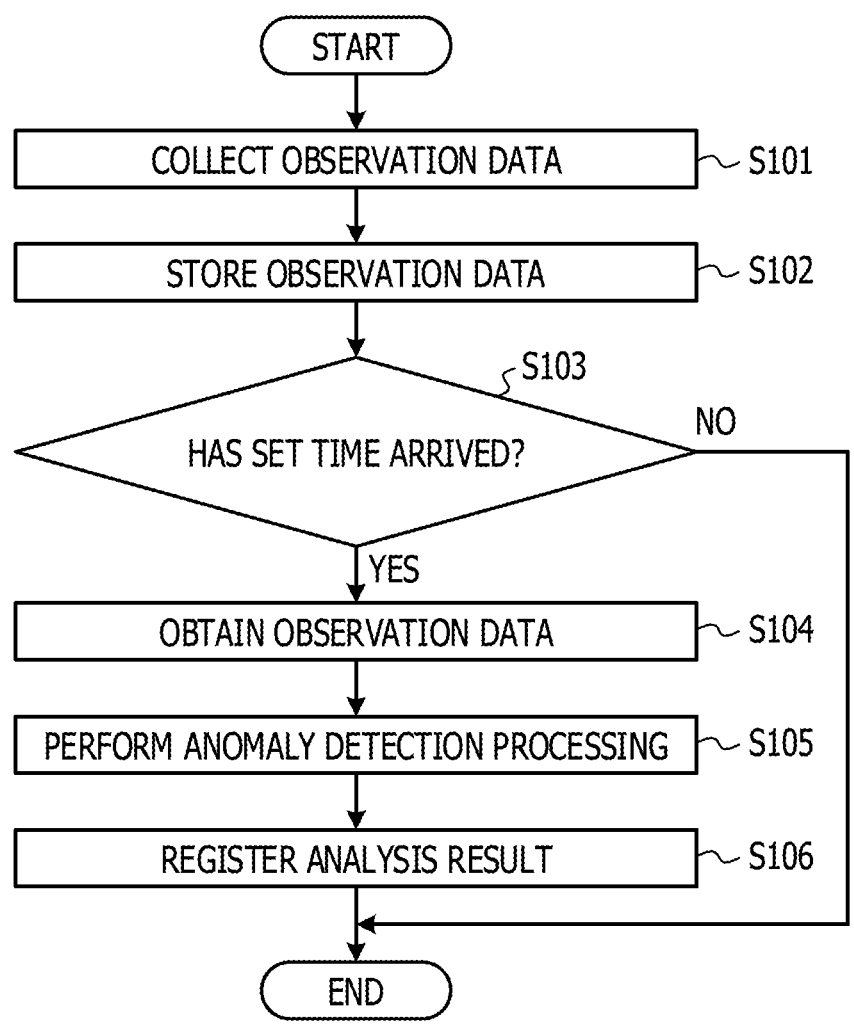
FIG. 6 is a flowchart illustrating an example of first processing performed by an observation data collecting unit and an anomaly detecting unit.

FIG. 6 is a flowchart illustrating an example of first processing performed by an observation data collecting unit and an anomaly detecting unit. The observation data collecting unit and the anomaly detecting unit described with reference to FIG. 6 may be the observation data collecting unit 210 and the anomaly detecting unit 230 illustrated in FIG. 3. The first processing is performed periodically (for example, in units of 10 minutes). First, the observation data collecting unit 210 collects observation data from the monitoring server 150 (step S101), and stores the collected observation data in the observation data storage unit 220 (step S102).

When the processing of step S102 is completed, the anomaly detecting unit 230 determines whether or not a set time has arrived (step S103). The set time is a time (for example, hours such as one hour) longer than the above-described fixed periods. Hence, for example, the observation data collecting unit 210 collects observation data and stores the observation data in the observation data storage unit 220 at intervals of 10 minutes, and the anomaly detecting unit 230 determines whether or not processing subsequent to the processing of step S103 is to be performed at intervals of one hour.

For example, when the set time has not arrived since the anomaly detecting unit 230 previously performed the processing subsequent to the processing of step S103 (step S103: NO), the subsequent processing of step S104 to S106 is skipped. Thus, the observation data collecting unit 210 collects observation data and stores the observation data in the observation data storage unit 220 each time 10 minutes has passed since collection of observation data. The observation data is thereby accumulated in the observation data storage unit 220.

When the set time has arrived since the anomaly detecting unit 230 previously performed the processing subsequent to the processing of step S103 (step S103: YES), on the other hand, the anomaly detecting unit 230 obtains the observation data from the observation data storage unit 220 (step S104). When completing the processing of step S104, the anomaly detecting unit 230 performs anomaly detection processing (step S105), and registers an analysis result in the analysis target table T1 (step S106). A distinguishing flag "0" or a distinguishing flag "1" is thereby associated with the observation data (see FIG. 4).

Figure 7:
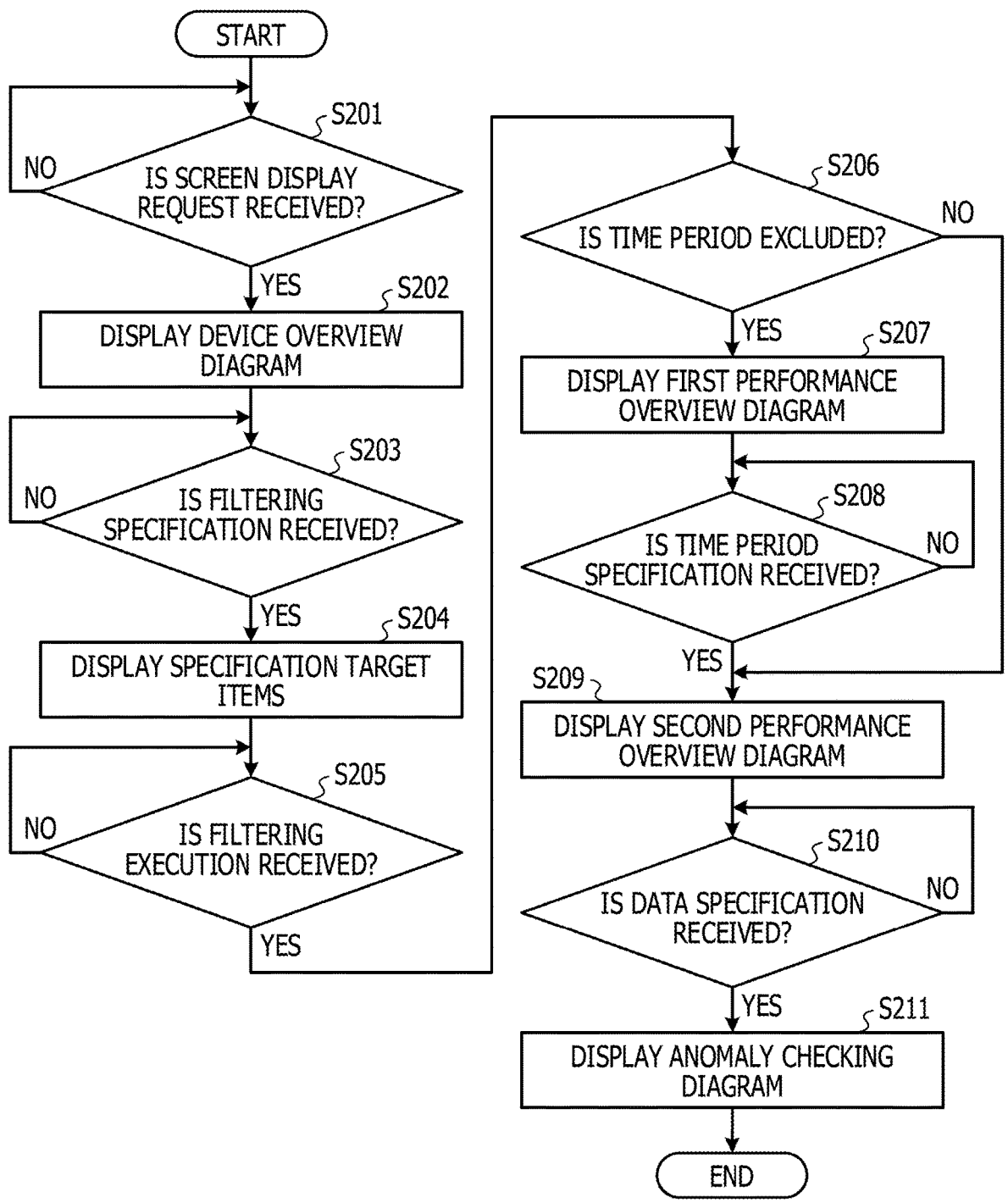
FIG. 7 is a flowchart illustrating an example of second processing performed by an observation data visualizing unit.

FIG. 7 is a flowchart illustrating an example of second processing performed by an observation data visualizing unit. The observation data visualizing unit described with reference to FIG. 7 may be the observation data visualizing unit 240 illustrated in FIG. 3. FIGS. 8 to 14 are each an example of an anomaly analysis screen. Incidentally, FIGS. 9 to 12 and FIG. 14 omit a bottom part of the anomaly analysis screen. In addition, FIG. 13 omits an analysis period, specification target items, and the like to be described later.

First, the observation data visualizing unit 240 waits until receiving a screen display request from the monitoring terminal 300 (step S201: NO). When the observation data visualizing unit 240 receives a screen display request (step S201: YES), the observation data visualizing unit 240 displays a device overview diagram (step S202).

Figure 8:
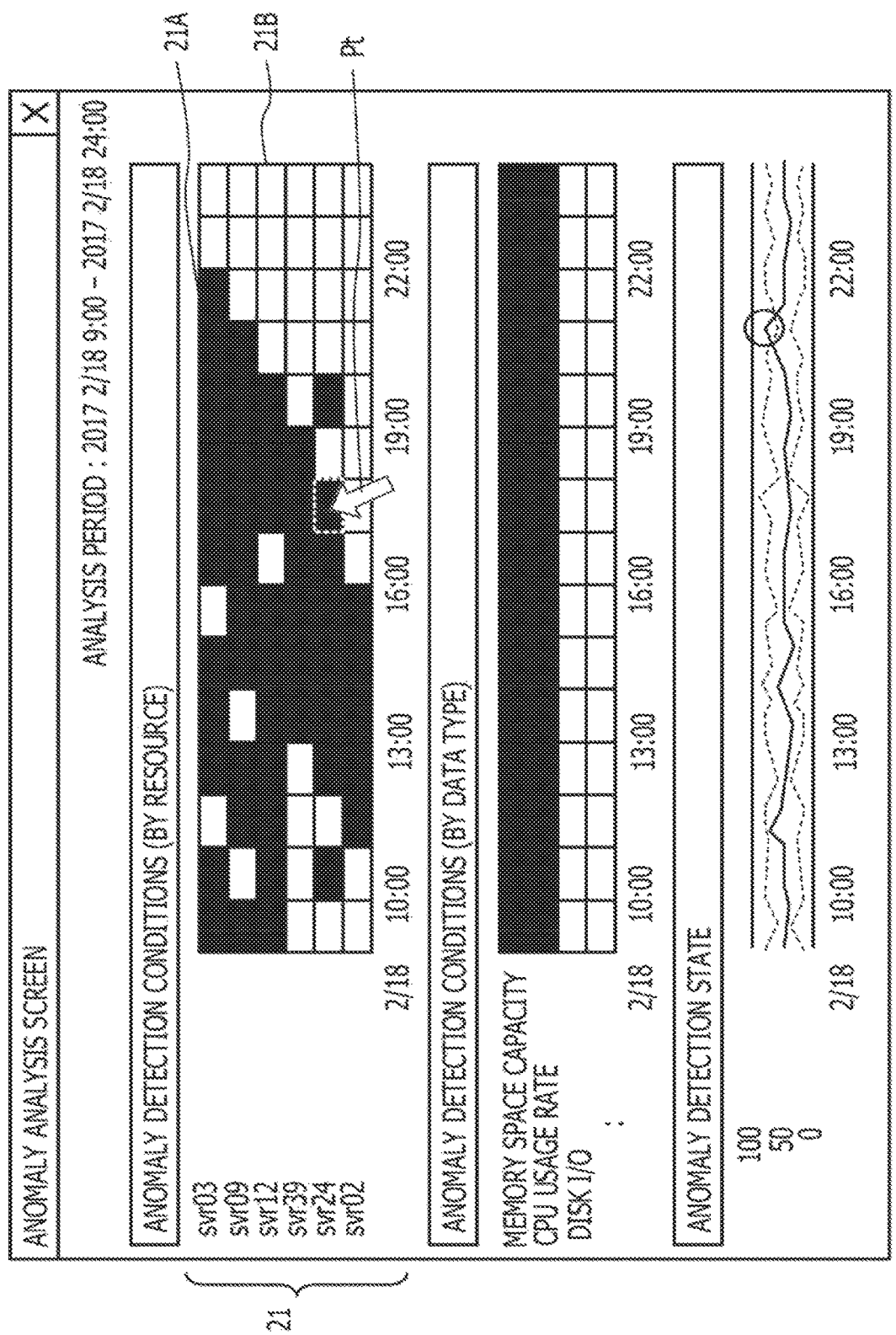
FIG. 8 represents an example of an anomaly analysis screen.

Here, the device overview diagram represents correspondence relations between time periods in which anomalies are detected within a specific period and monitoring target resources 110 in which the anomalies are detected. For example, as illustrated in FIG. 8, the observation data visualizing unit 240 displays a device overview diagram 21 in a top part of the anomaly analysis screen based on the result of the anomaly detection processing. The device overview diagram 21 illustrates anomaly detection conditions for each resource ID at intervals of one hour in an analysis period from "9:00 on Feb. 18, 2017" to "24:00 on Feb. 18, 2017" as the specific period. A black region 21A in the device overview diagram 21 is a combination of a resource ID and a time period in which an anomaly is detected. A white region 21B in the device overview diagram 21 is a combination of a resource ID and a time period in which no anomaly is detected.

The observation data visualizing unit 240 determines the arrangement order of resource IDs based on the numbers of detected anomalies. For example, the observation data visualizing unit 240 displays the device overview diagram 21 in which the larger the number of detected anomalies, the higher the position at which the corresponding resource ID is placed. Hence, it is not necessarily true that the larger the number of black regions 21A for a resource ID, the higher the position at which the resource ID is disposed. When many anomalies are detected in a time period in question, the resource ID corresponding to the detected anomalies is disposed at a higher position. For example, in a case where the number of detected anomalies of a certain first resource ID in a first time period is one, and the number of detected anomalies of a certain second resource ID in the first time period is three, the observation data visualizing unit 240 displays the device overview diagram 21 in which the second resource ID is disposed at a position higher than the first resource ID. Incidentally, the observation data visualizing unit 240 may display diagrams below the device overview diagram 21, or may not display diagrams below the device overview diagram 21.

Returning to FIG. 7, when completing the processing of step S202, the observation data visualizing unit 240 then waits until receiving a filtering specification from the monitoring terminal 300 (step S203: NO). When the observation data visualizing unit 240 receives a filtering specification (step S203: YES), the observation data visualizing unit 240 displays specification target items (step S204).

Figure 9:
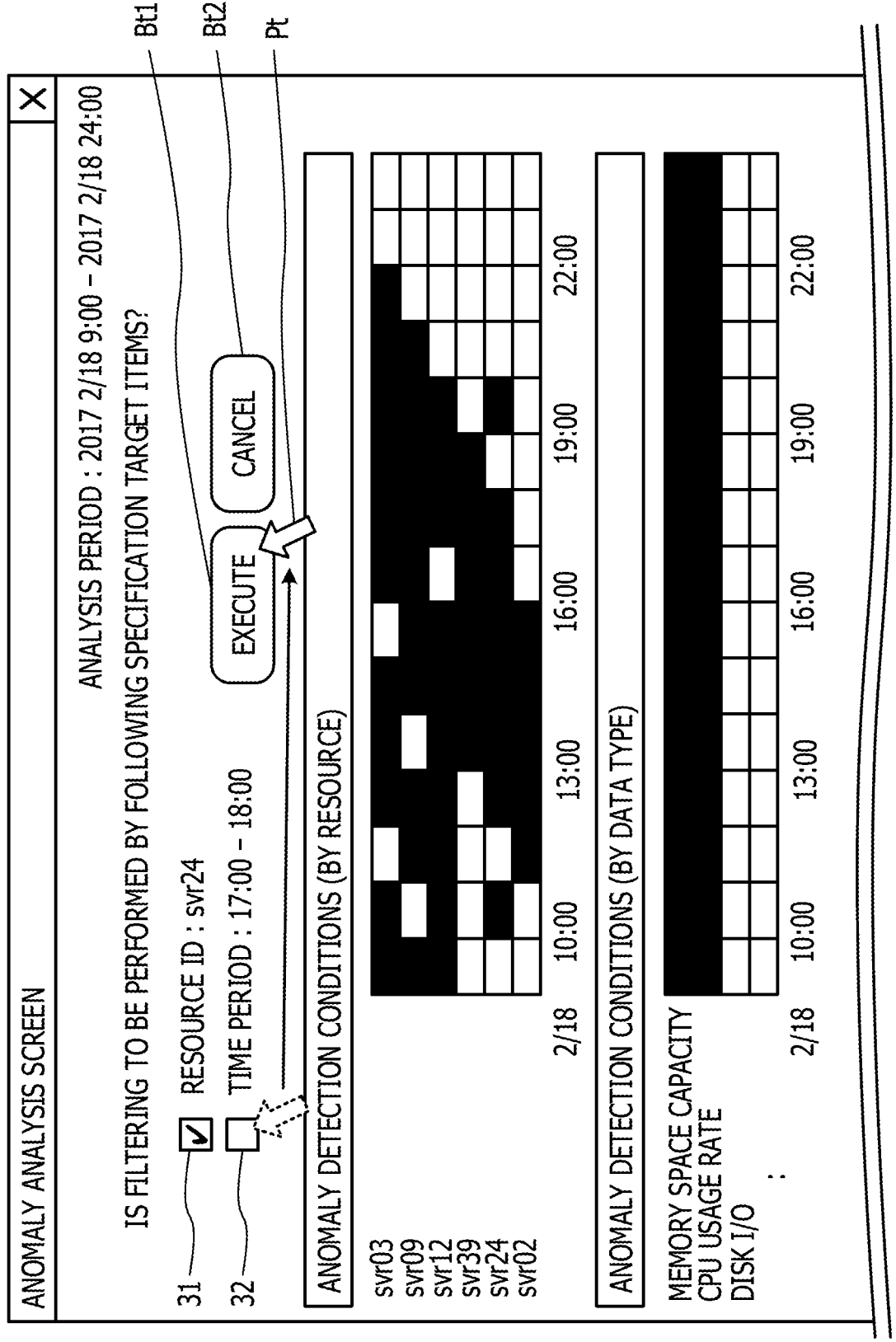
FIG. 9 represents an example of an anomaly analysis screen.

For example, as illustrated in FIG. 8, when a combination of a resource ID and a time period is specified and designated by a pointer Pt in the device overview diagram 21, the observation data visualizing unit 240 receives the specification of the combination. In the present embodiment, a combination of a resource ID "svr24" and a time period "17:00 to 18:00" is specified by the pointer Pt. When the observation data visualizing unit 240 receives the specification of the combination of the resource ID and the time period, the observation data visualizing unit 240 displays two specification target items and check boxes 31 and 32 in a top part of the device overview diagram 21, as illustrated in FIG. 9. In the present embodiment, the observation data visualizing unit 240 displays the specification target item "resource ID: svr24" and the specification target item "time period: 17:00 to 18:00." The check boxes 31 and 32 are selection boxes for selecting the respective specification target items. Immediately after the specification target items are displayed, a checkmark is input to each of the check boxes 31 and 32. In addition, the observation data visualizing unit 240 displays an executing button Bt1 and a canceling button Bt2 in addition to the display of the two specification target items and the like.

Here, as illustrated in FIG. 7, the observation data visualizing unit 240 waits until receiving a filtering execution from the monitoring terminal 300 (step S205: NO). When the observation data visualizing unit 240 receives a filtering execution (step S205: YES), the observation data visualizing unit 240 further determines whether or not the time period is excluded (step S206). When the time period is excluded (step S206: YES), the observation data visualizing unit 240 displays a first performance overview diagram (step S207).

Figure 10:
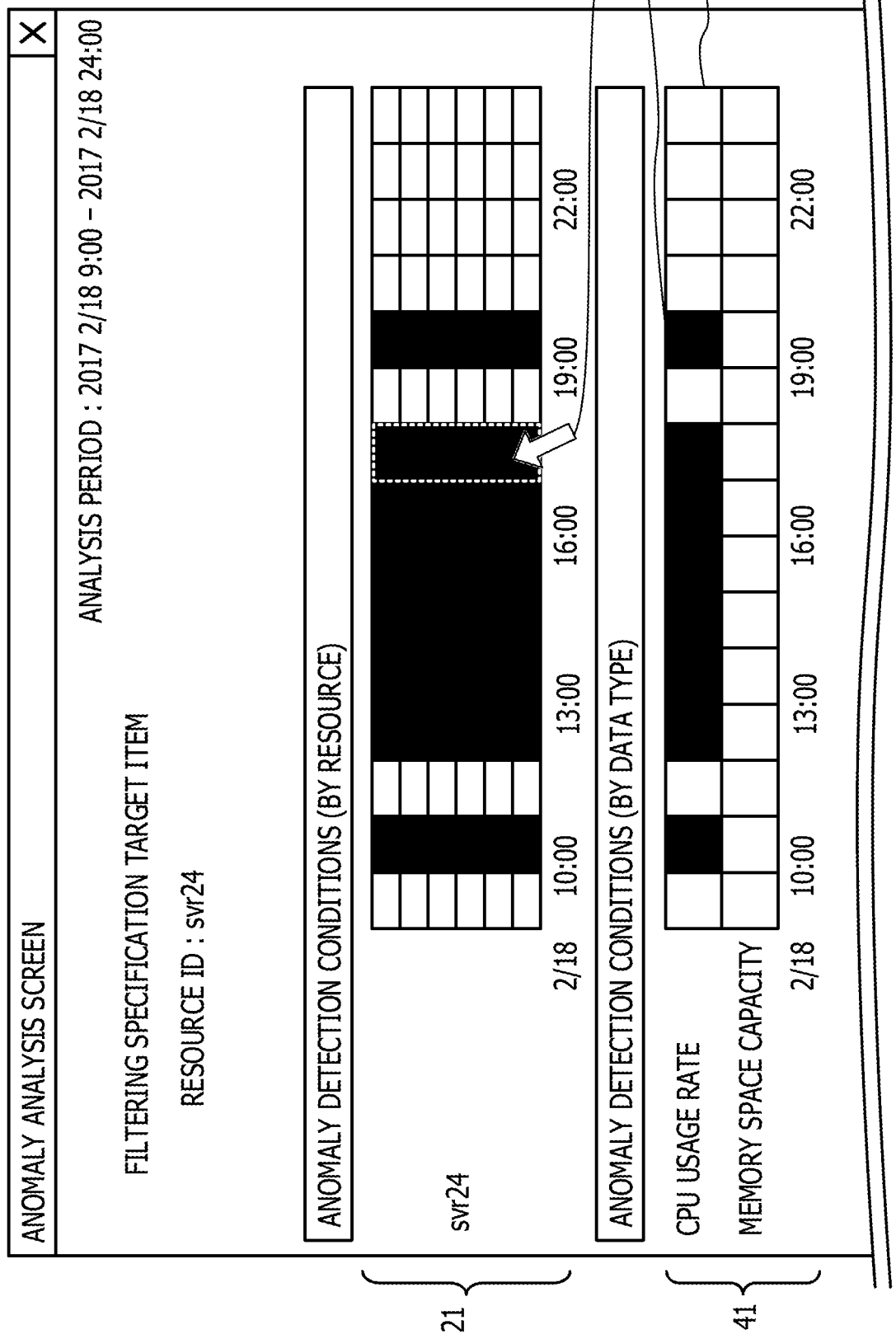
FIG. 10 represents an example of an anomaly analysis screen.

For example, as illustrated in FIG. 9, when the executing button Bt1 is depressed by the pointer Pt, the observation data visualizing unit 240 receives the filtering execution. Here, as illustrated in FIG. 9, when the executing button Bt1 is depressed by the pointer Pt in a state in which the checkmark in the check box 32 corresponding to the specification target item "time period: 17:00 to 18:00" is removed by the pointer Pt, the observation data visualizing unit 240 determines in the processing of step S206 that the time period is excluded. In this case, as illustrated in FIG. 10, the observation data visualizing unit 240 displays a first performance overview diagram 41 in a middle part of the anomaly analysis screen. In addition, the observation data visualizing unit 240 updates the device overview diagram 21 in addition to displaying the first performance overview diagram 41. For example, the observation data visualizing unit 240 displays the device overview diagram 21 in which time periods are not limited while resource IDs are limited.

Here, the first performance overview diagram 41 is a diagram illustrating correspondence relations between time periods in which anomalies are detected based on a plurality of kinds of observation data corresponding to the specified resource ID within the analysis period and the observation data. The first performance overview diagram 41 illustrates anomaly detection conditions for each data type ID at intervals of one hour in the analysis period from "9:00 on Feb. 18, 2017" to "24:00 on Feb. 18, 2017." A black region 41A in the first performance overview diagram 41 is a combination of a data type ID and a time period in which an anomaly is detected. A white region 41B in the first performance overview diagram 41 is a combination of a data type ID and a time period in which no anomaly is detected. Incidentally, the observation data visualizing unit 240 determines the arrangement order of data type IDs based on the numbers of detected anomalies as in the case of determining the arrangement order of resource IDs.

Returning to FIG. 7, the observation data visualizing unit 240 waits until receiving a time period specification from the monitoring terminal 300 (step S208: NO). When the observation data visualizing unit 240 receives a time period specification (step S208: YES), the observation data visualizing unit 240 displays a second performance overview diagram (step S209).

Figure 11:
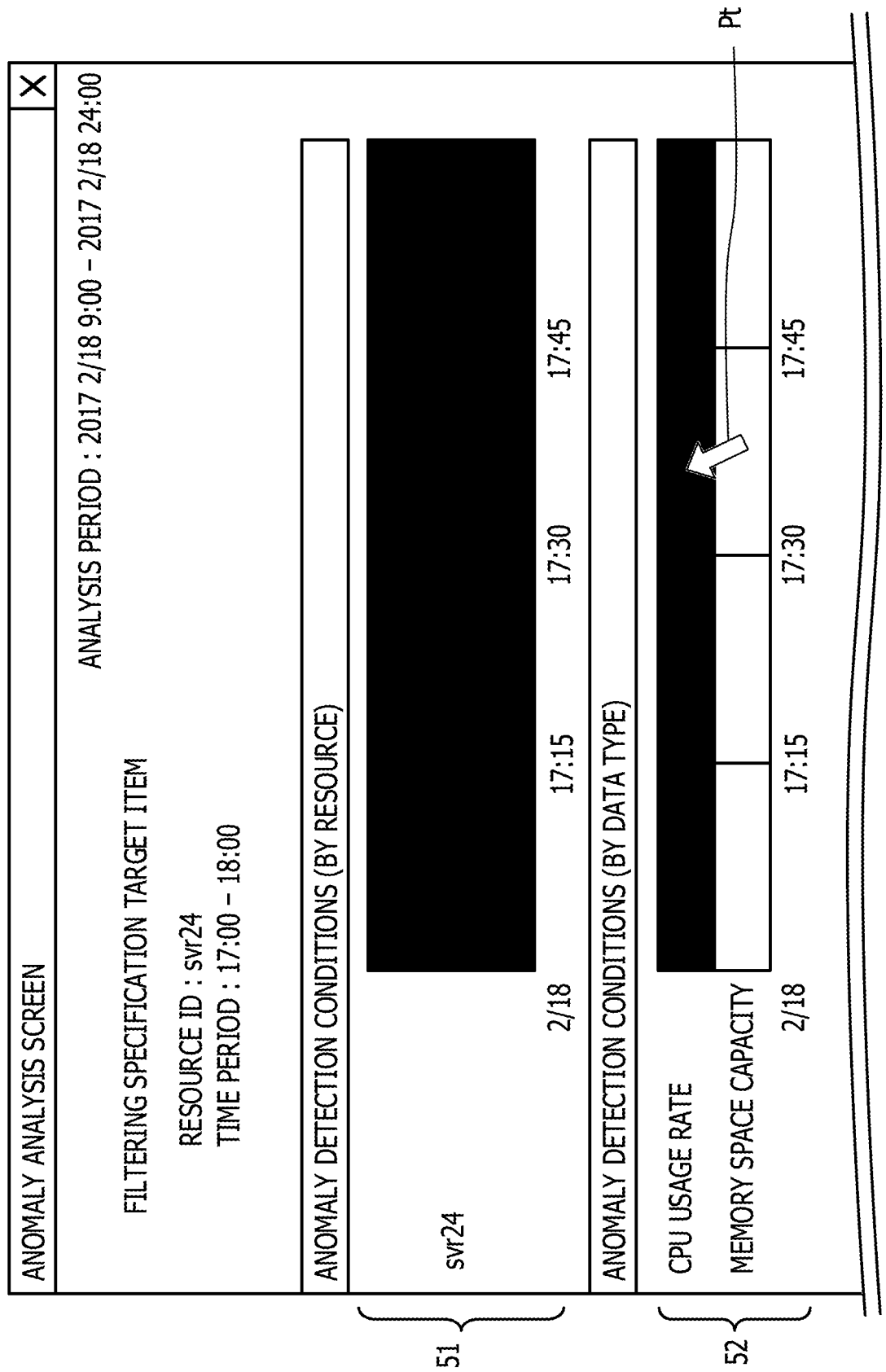
FIG. 11 represents an example of an anomaly analysis screen.

For example, as illustrated in FIG. 10, when a time period is specified and designated by the pointer Pt in the device overview diagram 21 in which resource IDs are limited, the observation data visualizing unit 240 receives the time period specification. In the present embodiment, the time period "17:00 to 18:00" is specified by the pointer Pt. When the observation data visualizing unit 240 receives the time period specification, the observation data visualizing unit 240 updates the device overview diagram 21 and the first performance overview diagram 41 to a device overview diagram 51 and a second performance overview diagram 52 in which time periods are limited as well as resource IDs, as illustrated in FIG. 11. In the present embodiment, the observation data visualizing unit 240 displays the device overview diagram 51 and the second performance overview diagram 52 that are limited to the resource ID "svr24" and the time period "17:00 to 18:00." For example, the analysis period from an analysis start time "9:00" to an analysis end time "24:00" is updated to the time period "17:00 to 18:00."

Figure 12:
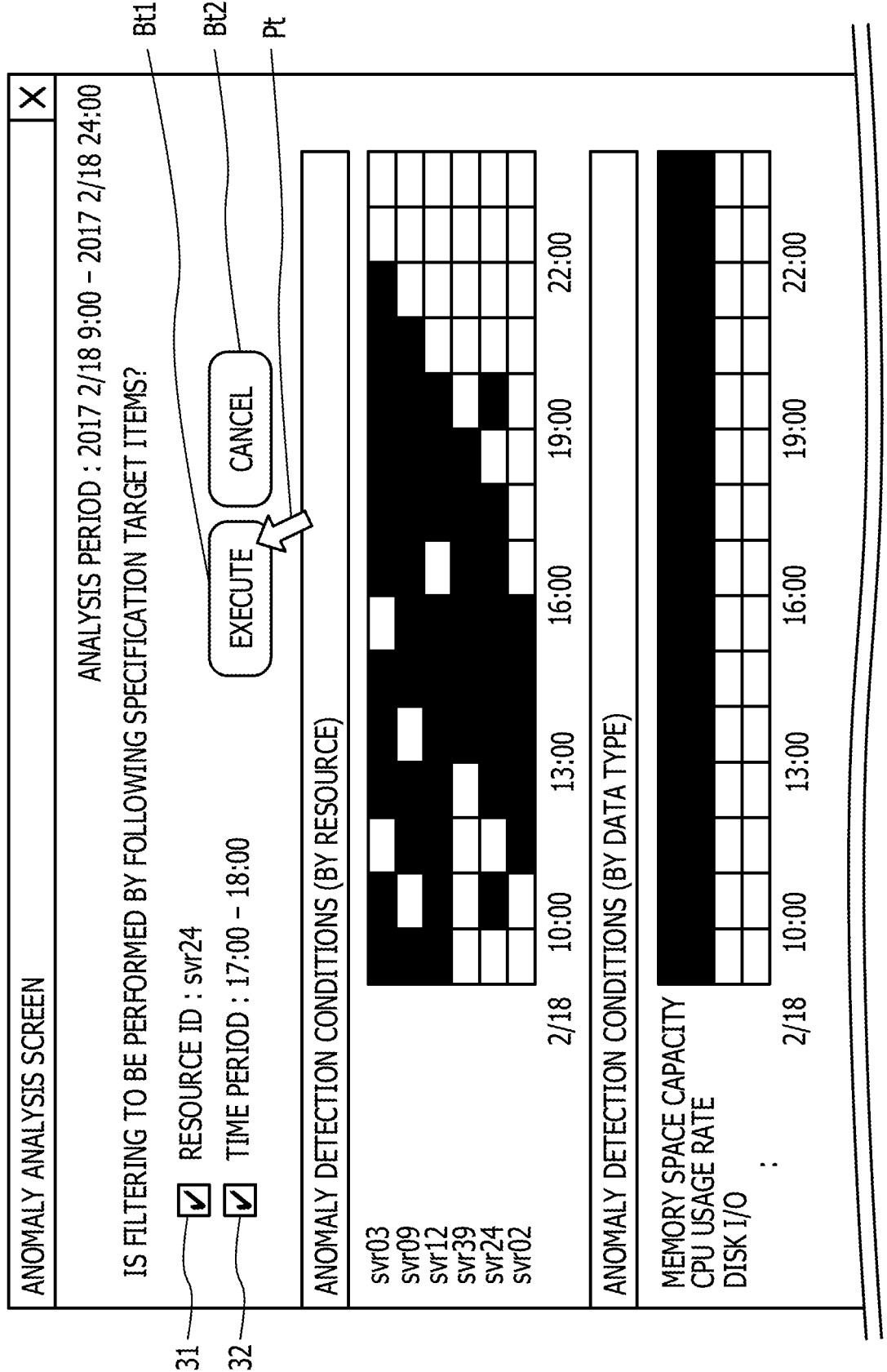
FIG. 12 represents an example of an anomaly analysis screen.

Incidentally, when the time period is not excluded in the processing of step S206 illustrated in FIG. 7 (step S206: NO), the observation data visualizing unit 240 skips the processing of steps S207 and S208, and performs the processing of step S209. For example, as illustrated in FIG. 12, when the executing button Bt1 is depressed by the pointer Pt in a state in which the checkmark in the check box 32 corresponding to the specification target item "time period: 17:00 to 18:00" is not removed by the pointer Pt, the observation data visualizing unit 240 determines in the processing of step S206 that the time period is not excluded. In this case, as illustrated in FIG. 11, the observation data visualizing unit 240 displays the device overview diagram 51 and the second performance overview diagram 52 that are limited to the resource ID "svr24" and the time period "17:00 to 18:00." For example, in this case, the observation data visualizing unit 240 displays the anomaly analysis screen including the second performance overview diagram 52 as illustrated in FIG. 11 without displaying the anomaly analysis screen including the first performance overview diagram 41 as illustrated in FIG. 10.

Returning to FIG. 7, after completing the processing of step S209, the observation data visualizing unit 240 waits until receiving a data specification (step S210: NO). When the observation data visualizing unit 240 receives a data specification (step S210: YES), the observation data visualizing unit 240 displays an anomaly checking diagram (step S211).

Figure 13:
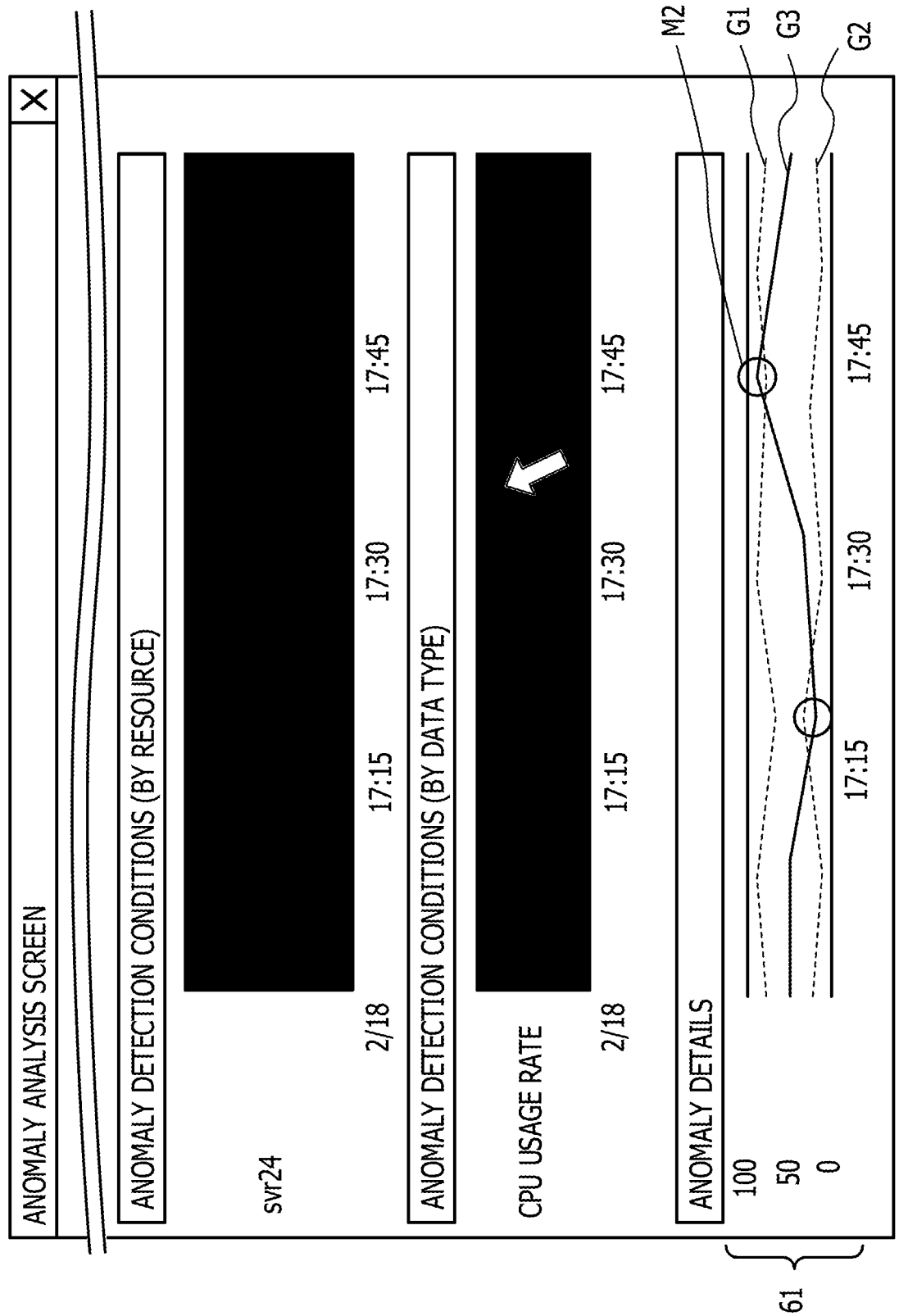
FIG. 13 represents an example of an anomaly analysis screen.

For example, as illustrated in FIG. 11, when observation data is specified and designated by the pointer Pt in the second performance overview diagram 52 in which resource IDs and time periods are limited, the observation data visualizing unit 240 receives the data specification. In the present embodiment, the observation data of the data type ID "CPU usage rate" is specified by the pointer Pt, but a time period "17:30 to 17:45" is excluded without being specified. For example, when the observation data is specified and designated by the pointer Pt in the second performance overview diagram 52, the observation data is not limited to the time period at the specified position. When the observation data visualizing unit 240 receives the data specification, the observation data visualizing unit 240 displays an anomaly checking diagram 61 in which resource IDs and time periods are limited in a bottom part of the anomaly analysis screen, as illustrated in FIG. 13. In the present embodiment, the observation data visualizing unit 240 displays the anomaly checking diagram 61 limited to the resource ID "svr24" and the time period "17:00 to 18:00."

Figure 14:
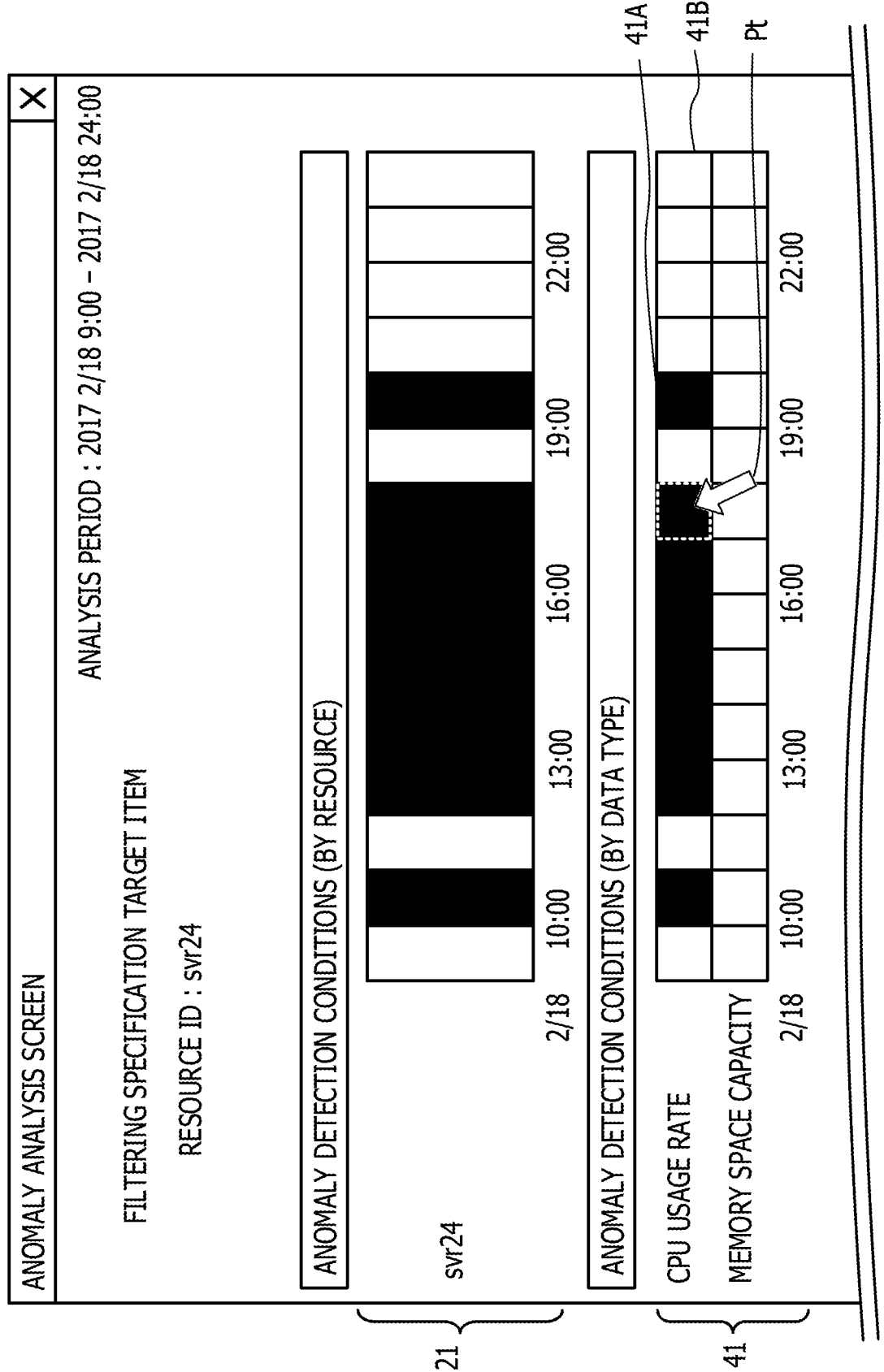
FIG. 14 represents an example of an anomaly analysis screen.

Incidentally, as illustrated in FIG. 14 similar to FIG. 10, when a time period is specified and designated by the pointer Pt in the first performance overview diagram 41 in which resource IDs are limited, the observation data visualizing unit 240 receives the time period specification. In the present embodiment, the time period "17:00 to 18:00" is specified by the pointer Pt. Also when the observation data visualizing unit 240 receives such a time period specification, the observation data visualizing unit 240 displays the anomaly checking diagram 61 in which resource IDs and time periods are limited, as illustrated in FIG. 13.

Here, the anomaly checking diagram 61 is a diagram illustrating time series changes in the observation data of the specified data type ID for the specified resource ID and the specified time period such that positions at which anomalies are detected are recognized. For example, as illustrated in FIG. 13, the anomaly checking diagram 61 indicates time series changes in the observation data of the specified data type ID for the specified resource ID and the specified time period by graphs G1 and G2 indicating an upper limit and a lower limit, respectively, at a normal time and a graph G3 indicating data values. For example, in the present embodiment, the anomaly checking diagram 61 indicates time series changes in the observation data of the specified data type ID "CPU usage rate" for the specified resource ID "svr24" and the specified time period "17:00 to 18:00." Marks M1 and M2 are added to positions at which the graph G3 goes beyond the graph G1 and the graph G2. For example, the mark M1 is added to the position at which the graph G3 goes beyond the graph G2, and the mark M2 is added to the position at which the graph G3 goes beyond the graph G1. An operation monitor may understand the positions at which anomalies are detected based on the marks M1 and M2. Incidentally, while the two marks M1 and M2 are added in FIG. 13, one of the marks M1 and M2 may be added, or three or more marks may be added, depending on the graph G3. Returning to FIG. 7, when completing the processing of step S211, the observation data visualizing unit 240 ends the second processing.

As described above, according to the present embodiment, the analysis server 200 includes the observation data collecting unit 210, the anomaly detecting unit 230, and the observation data visualizing unit 240. The observation data collecting unit 210 collects information of a plurality of kinds of observation data for each of the plurality of monitoring target resources 110. The anomaly detecting unit 230 performs the anomaly detection processing on the plurality of kinds of observation data collected by the observation data collecting unit 210.

Then, the observation data visualizing unit 240 displays the device overview diagram 21 indicating correspondence relations between time periods in which anomalies are detected within the analysis period and monitoring target resources 110 in which the anomalies are detected based on a result of the anomaly detection processing. In addition, when the observation data visualizing unit 240 receives a specification of a combination of a monitoring target resource 110 and a time period in the display of the device overview diagram 21, the observation data visualizing unit 240 displays the first performance overview diagram 41 indicating correspondence relations between time periods in which anomalies are detected based on a plurality of kinds of observation data within the analysis period in the specified monitoring target resource 110 and the observation data. Further, when the observation data visualizing unit 240 receives a specification of observation data in the display of the first performance overview diagram 41, the observation data visualizing unit 240 displays, for the monitoring target resource 110 and the time period specified in the device overview diagram 21, the anomaly checking diagram 61 illustrating time series changes in the observation data specified in the display of the first performance overview diagram 41 such that positions at which anomalies are detected are recognized. A work load of monitoring work may be thereby reduced.

The preferred embodiment of the present technology has been described above in detail. However, the present technology is not limited to the particular embodiment of the present technology. The present technology is susceptible of various modifications and changes without departing from the spirit of the present technology described in claims.

Figures 15A, 15B:
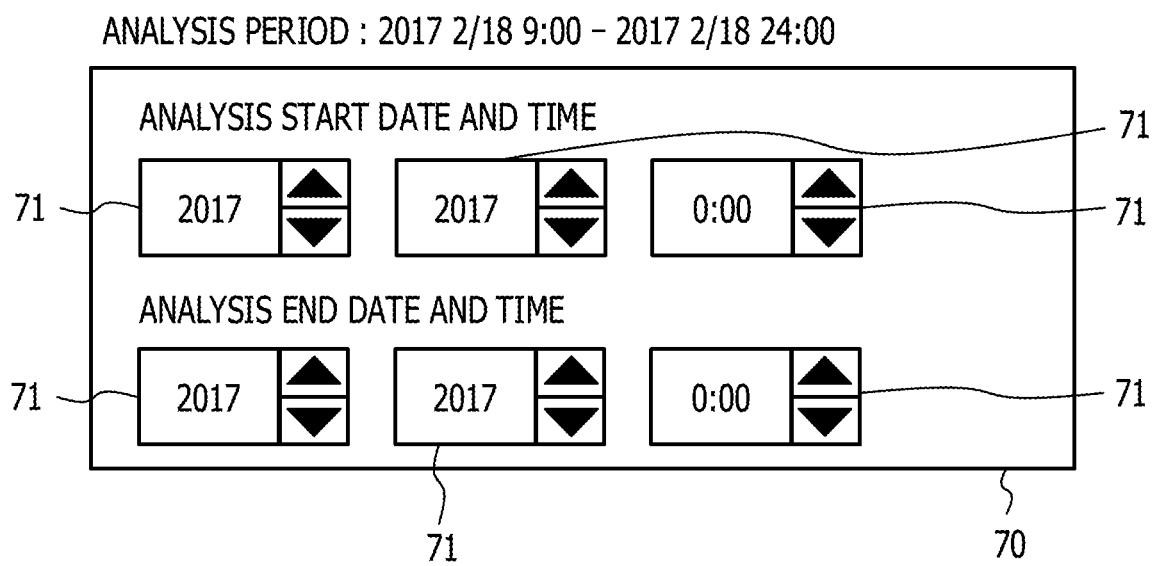
FIGS. 15A and 15B are diagrams of assistance in explaining an example of changing settings of an analysis period.

For example, the observation data visualizing unit 240 may change the above-described analysis period based on a setting or a selection (hereinafter referred to simply as a setting). FIGS. 15A and 15B are diagrams of assistance in explaining an example of changing settings of an analysis period. For example, when a display region of the analysis period, the display region being included in the anomaly analysis screen, is indicated by the pointer Pt, as illustrated in FIG. 15A, the observation data visualizing unit 240 displays a screen 70 for setting the analysis period, as illustrated in FIG. 15B. When the operation monitor gives instructions to a plurality of setting items 71 included in the screen 70, the observation data visualizing unit 240 changes an analysis start date and time and an analysis end date and time based on the instructions. By thus changing the analysis period as appropriate, the operation monitor may check anomaly detection conditions in various analysis periods.

In addition, in the foregoing embodiment, description has been made of an example in which the anomaly detecting unit 230 detects anomalies of observation data using the normal distribution 10 of the observation data. In a case where the observation data collecting unit 210 collects observation data at a same time during a plurality of consecutive days (one week or the like) in the past, for example, the anomaly detecting unit 230 may detect anomalies of observation data on a day of analysis based on these pieces of observation data collected by the observation data collecting unit 210. Thus, there is a case where an anomaly is detected in a unit of one day but no anomaly is detected in a unit of one week. By thus changing the analysis period, the operation monitor may check anomaly detection conditions variously.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    collecting information of a plurality of kinds of observation data for each of a plurality of target devices;
    performing anomaly detection processing on the collected plurality of kinds of observation data;
    displaying, on a screen of a display device, a first display indicating a correspondence relation between a first time period in which a first anomaly is detected within a specific period and a target device in which the first anomaly is detected based on a result of the anomaly detection processing;
    displaying, on the screen, a second display upon receiving a first designation of the target device and a second time period that is a part of the first time period in the first display, the second display indicating whether a second anomaly is detected for each of the plurality of kinds of observation data in the second time period of the target device designated in the first designation; and
    displaying, on the screen, a third display upon receiving a second designation of specific observation data in the second display, the third display indicating time series changes in the specific observation data designated in the second designation and the second time period.

2. The non-transitory computer-readable storage medium according to claim 1, wherein
    the displaying the second display displays the second display when the first designation is received and when a selection for excluding another part of the first time period in the first designation is received after a reception of the first designation.

3. The non-transitory computer-readable storage medium according to claim 1, wherein the process further comprises:
    displaying, on the screen, a fourth display when the first designation is received and when a selection for leaving the first time period in the first designation is received after a reception of the first designation, the fourth display indicating a correspondence relation between the second time period in which the second anomaly is detected based on the plurality of kinds of observation data in the first time period in the designated target device and the specific observation data designated in the second designation.

4. The non-transitory computer-readable storage medium according to claim 1, wherein
    the first display includes pieces of identification information corresponding to the plurality of target devices in which the first anomaly is detected, the pieces of identification information being displayed in accordance with an arrangement order of the pieces of identification information determined based on a number of detected anomalies detected within the specific period.

5. The non-transitory computer-readable storage medium according to claim 1, wherein
    the second display includes pieces of identification information corresponding to the plurality of target devices in which the second anomaly is detected, the pieces of identification information being displayed in accordance with an arrangement order of the pieces of identification information determined based on a number of detected anomalies detected within the specific period.

6. The non-transitory computer-readable storage medium according to claim 1, wherein
    the specific period is changeable based on a setting or a selection.

7. A display control method executed by a computer, the display control method comprising:
    collecting information of a plurality of kinds of observation data for each of a plurality of target devices;
    performing anomaly detection processing on the collected plurality of kinds of observation data;
    displaying, on a screen of a display device, a first display indicating a correspondence relation between a first time period in which a first anomaly is detected within a specific period and a target device in which the first anomaly is detected based on a result of the anomaly detection processing;
    displaying, on the screen, a second display upon receiving a first designation of the target device a second time period that is a part of the first time period in the first display, the second display indicating whether a second anomaly is detected for each of the plurality of kinds of observation data in the second time period of the target device designated in the first designation; and
    displaying, on the screen, a third display upon receiving a second designation of specific observation data in the second display, the third display indicating time series changes in the specific observation data designated in the second designation and the second time period.

8. A display control device comprising:
    a memory; and
    a processor coupled to the memory and the processor configured to execute a process, the process including:
        collecting information of a plurality of kinds of observation data for each of a plurality of target devices;
        performing anomaly detection processing on the collected plurality of kinds of observation data;
        displaying, on a screen of a display device, a first display indicating a correspondence relation between a first time period in which a first anomaly is detected within a specific period and a target device in which the first anomaly is detected based on a result of the anomaly detection processing;
        displaying, on the screen, a second display upon receiving a first designation of the target device and a second time period limited by a part of the first time period in the first display, the second display indicating whether a second anomaly is detected for each of the plurality of kinds of observation data in the second time period of the designated target device; and displaying, on the screen, a third display upon receiving a second designation of specific observation data in the second display, the third display indicating time series changes in the specific observation data designated in the second designation and the second time period.

* * * * *